United States Patent [19]

Lopez et al.

[11] 4,018,733
[45] Apr. 19, 1977

[54] HOT MELT ADHESIVE COMPOSITION COMPRISING AN ACIDIC ETHYLENE POLYMER AND A POLYAMIDE

[75] Inventors: Eugene Francis Lopez, Sunnyvale; Leon Conrad Glover, Jr., Los Altos; Bernard John Lyons, Atherton, all of Calif.

[73] Assignee: Raychem Corporation, Menlo Park, Calif.

[22] Filed: July 29, 1974

[21] Appl. No.: 492,722

Related U.S. Application Data

[63] Continuation-in-part of Ser. No. 291,542, Sept. 25, 1972, abandoned.

[52] U.S. Cl. .............................. 260/27 EV; 156/327; 156/331; 179/30; 260/18 PN; 260/23 R; 260/28.5 AV; 260/828

[51] Int. Cl.$^2$ ........................................... C09J 3/14

[58] Field of Search .... 260/27 EV, 23 R, 28.5 AV, 260/18 PN, 828; 156/331, 327

[56] References Cited

UNITED STATES PATENTS

| | | | |
|---|---|---|---|
| 2,379,413 | 7/1945 | Bradley | 260/404.5 |
| 2,770,609 | 11/1956 | Symonds | 260/32.6 |
| 2,964,545 | 12/1960 | Harrison | 260/407 |
| 3,010,782 | 11/1961 | McCaleb et al. | 21/2.7 |
| 3,148,059 | 9/1964 | Brunson | 260/27 EV |
| 3,165,489 | 1/1965 | Roth | 260/31.2 |
| 3,215,657 | 11/1965 | Beresniewicz et al. | 260/28.5 |
| 3,215,678 | 11/1965 | Adelmar | 260/80.5 |
| 3,232,895 | 2/1966 | Klein et al. | 260/27 EV |
| 3,377,305 | 4/1968 | House | 260/27 |
| 3,423,231 | 1/1969 | Lutzmann | 117/68.5 |
| 3,449,273 | 6/1969 | Ketienring et al. | 260/18 |
| 3,464,940 | 9/1969 | Barton et al. | 260/23 H |
| 3,484,403 | 12/1969 | Brunson et al. | 260/27 EV |
| 3,531,423 | 9/1970 | Stokes et al. | 260/18 |
| 3,535,293 | 10/1970 | Anderson | 260/78.5 |
| 3,626,026 | 12/1971 | Fukumura et al. | 260/27 |
| 3,636,136 | 1/1972 | Konopik | 260/857 L |
| 3,646,154 | 2/1972 | Marans et al. | 260/857 L |
| 3,652,712 | 3/1972 | Ahmed | 260/837 PV |
| 3,684,600 | 8/1972 | Smedberg | 156/315 |
| 3,690,936 | 9/1972 | Doss et al. | 260/23 H |
| 3,758,431 | 9/1973 | Taft et al. | 260/27 |
| 3,781,234 | 12/1973 | Drawert et al. | 260/18 N |
| 3,819,473 | 6/1974 | Russell et al. | 156/331 |
| 3,839,121 | 10/1974 | Schmitt et al. | 156/331 |
| 3,868,433 | 2/1975 | Bartz et al. | 156/327 |

FOREIGN PATENTS OR APPLICATIONS

| | | | |
|---|---|---|---|
| 633,689 | 6/1963 | Belgium | |
| 1,001,662 | 8/1965 | United Kingdom | |
| 1,004,478 | 9/1965 | United Kingdom | |
| 1,049,868 | 11/1966 | United Kingdom | |
| 1,052,319 | 12/1963 | United Kingdom | |
| 1,055,175 | 1/1967 | United Kingdom | |
| 1,072,635 | 6/1967 | United Kingdom | |
| 1,081,347 | 8/1967 | United Kingdom | |
| 1,081,662 | 8/1967 | United Kingdom | |
| 1,116,202 | 6/1968 | United Kingdom | |
| 1,157,569 | 7/1969 | United Kingdom | |
| 1,163,113 | 9/1969 | United Kingdom | |
| 1,167,517 | 10/1969 | United Kingdom | |
| 1,213,293 | 11/1970 | United Kingdom | |
| 1,214,781 | 12/1970 | United Kingdom | |
| 1,241,361 | 8/1971 | United Kingdom | |
| 1,262,802 | 2/1972 | United Kingdom | |
| 1,267,198 | 3/1972 | United Kingdom | |
| 1,271,743 | 4/1972 | United Kingdom | |
| 1,304,888 | 1/1973 | United Kingdom | |
| 1,167,516 | 10/1969 | United Kingdom | 260/24 |
| 1,284,489 | 8/1972 | United Kingdom | 260/27 EV |

*Primary Examiner*—Ronald W. Griffin
*Attorney, Agent, or Firm*—Lyon & Lyon

[57] ABSTRACT

A hot melt adhesive composition comprising a compatible mixture of: (a) an acidic ethylene polymer having an acid number ranging from about 3 to about 80 and (b) a polyamide having an amine number ranging from about 70 to about 400, together with a minor effective amount of a tackifying agent; components (a) and (b) being present in a relative proportion by weight ranging from about 80:20 to 20:80. An encapsulation method utilizing said adhesive is also described.

14 Claims, No Drawings

HOT MELT ADHESIVE COMPOSITION COMPRISING AN ACIDIC ETHYLENE POLYMER AND A POLYAMIDE

REFERENCE TO RELATED APPLICATIONS

This application is a continuation-in-part of copending, commonly assigned application Ser. No. 291,542 filed Sept. 25, 1972, now abandoned.

BACKGROUND OF THE INVENTION

The use of hot melt adhesives for bonding plastic compositions to other plastic compositions of the same or a different type or to metals is of course well known. In particular, hot melt adhesives are widely used in bonding plastic sleeves, end caps and the like to power cables or conduits or to various types of metal or plastic pipe or tubing. Unfortunately, none of the currently available hot melt adhesives possess all the properties which are desirable if the adhesive is to be truly effective in a wide variety of environments. Specific desirable features all of which are not possessed by any currently available hot melt adhesive include good low temperature impact resistance, i.e., the adhesive should not be brittle and frangible at temperatures at least as low as −40° C and also should have good peel strength over the temperature range of −40° C to at least +70° C to which such materials may be exposed in service. In particular, good peel strength with difficulty bondable substrates such as lead and polyethylene is desirable for cable splicing and capping applications, but is not obtainable with available adhesives over the above indicated temperature range. Such wide temperature range applicability is important since winter temperatures in many areas can easily drop to −40° C and conversely in direct sunlight a black cable or pipe can reach surface skin temperatures of at least +70° C (158° F).

A particular use for hot melt adhesives is with respect to heat recoverable (i.e., elastic memory) end caps and jackets. In recent years increasing attention has been paid to the use of articles exhibiting the property of elastic memory in providing environmental insulation to electrically conductive wire and cable, pipelines, and the like. An article having this property is one which has been deformed from an original heat-stable dimensional form into a different, heat-unstable form. While this article is maintained below a certain temperature, it will retain its unstable form, but when it is heated to above this temperature, termed the recovery temperature, it will recover to or toward its original form. One method of imparting the property of elastic memory, and materials to which that memory may be imparted, are disclosed in U.S. Pat. No. 3,086,242 to Cook, et. al, whose disclosure is incorporated by reference herein. Generally, provision is made for adhesive bonding between the elastic memory article and the substrate about which it is recovered, and in particular cases the nature of the substrate has prevented obtainment of suitable bonds with adhesives heretofore available. For example, it has become common to employ heat shrinkable polyethylene end caps in sealing polyethylene jacketed telecommunications lines, and much would be gained by extension of that teachnology to the benefit of the leadjacketed lines in widespread current use. Lead, however, is a notoriously poor adhesive substrate. Adhesives heretofore available have generally proved unsuitable, frequently affording peel strengths not significantly greater than about 3 pounds per linear inch (pli) even at room temperature and even less at temperatures significantly above or below room temperature. As already indicated, while in service telecommunication lines frequently encounter temperatures substantially greater and lower than room temperature. Currently extant specifications for cable end caps test peel strength at +70° C. Future specifications will require good peel strength at −40° C as well as at +70° C. In addition to affording suitable peel strength over this temperature range, end cap adhesives must soften at a temperature below that at which the end cap itself is degraded, yet sufficiently above maximum service temperature so as to prevent the end cap "milking off" the cable end when in use. A need has therefore existed for an end cap adhesive of sufficient peel strength at both high and low temperatures to permit applications involving lead-jacketed cable, which adhesive nonetheless displays a low embrittlement temperature and a softening temperature suiting it to use in such applications.

One object of the invention is to provide an adhesive suitable for polyethylene-lead bonding applications.

A further object of this invention is to provide an adhesive which exhibits superior high and low temperature peel strength in cable insulation employments.

Another object of the invention is to provide an adhesive whose embrittlement temperature and ring and ball softening point permits such employment.

The manner in which these and other objects and advantages of the invention has been attained will appear from the foregoing, and from the more detailed description of this invention which follows.

DETAILED DESCRIPTION OF THE INVENTION

It has now been found in accordance with the instant invention that these and other desirable objects can be attained with an adhesive composition comprising a compatible mixture of (a) an acidic ethylene polymer having an acid number ranging from about 3 to about 80 and (b) a polyamide of amine number ranging from about 70 to about 400, and consisting of an interpolymer of diamines and at least one dibasic acid preferably principally comprising dimer acid; together with a minor effective proportion of a tackifying agent; components a) and b) being blended in said composition in relative proportion by weight within the range from 20:80 to 80:20. The adhesive compositions of the present invention exhibit a ring and ball softening point within the range of about 90° to 160° C providing particularly suitable flowability when used with heat recoverable polyethylene end caps and sleeves.

The aforementioned composition is preferably prepared by admixing the components thereof at a temperature of at least about 100° C and most preferably at least about 150° C. Any of the conventional mixing apparatus used for plastic compounding such as for example steam-jacketed differential roller mills, high shear mixers or compounding extruders are suitable.

A suitable range, as heretofore indicated, based on 100 parts of (a) and (b) combined is from about 80 to 20 parts of (a) and, correspondingly, from about 20 to 80 parts of (b). Preferably components (a) and (b) will be present in a relative proportion by weight ranging from about 40:60 to 60:40. Components (a) and (b) are most preferably present in approximately equal amounts by weight. The amount of tackifier which is suitably present is from about 3 to 20 parts of tackifier, preferably about 5 to about 15 parts of tackifier per 100 parts of (a) and (b) together.

As will be described in greater detail hereinafter, ratios of these components which deviate significantly from those indicated above result in reduced adhesive effectiveness.

As above indicated, components (a) and (b) of the adhesive mixture must be compatible. The term compatible as used by polymer physicists connotes that the mixture of polymers has a single glass transition temperature range, as opposed to manifesting both of the separate glass transition temperature ranges characteristic of the constituent polymers. All of the amides and ethylene polymers disclosed and claimed herein are compatible with each other. The compatibility of these components may, of course, be determined by merely ascertaining that the mixture has only a single glass transistion temperature range. It should be noted that compatibility of this type between polymers of different chemical types, i.e., amide and ethylene polymers, is comparatively rare [see, e.g., J. Macromol. Sci., C7. 252 (1972) and U.S. Pat. No. 3,484,403].

Tackifying agents are well known in the adhesive art as useful adjuncts in adhesive formulations. The tackifying agents known to the art include a wide variety of natural and synthetic monomeric and polymeric substances, most of which, in general, have been found effective in the present adhesive formulations. Suitable tackifiers include by way of illustrations:

The absence of a tackifier or altenatively, use of a tackifier in amounts outside of the above indicated proportions produces an inferior adhesive. When less than about 3 parts tackifier is present in the adhesive formulation, poor wetting of the substrate with concomitant erratic adhesion with difficult to bond substrates often results. If greater than about 20 parts tackifier is added, the adhesive mixture tends to exhibit inferior peel strength at any temperature with most substrates.

Component (a) is either a terpolymer of ethylene, an ethylenically unsaturated mono- or dicarboxylic acid and a vinyl ester of a $C_1$ to $C_6$ straight or branched chain aliphatic carboxylic acid or, alternatively, a copolymer of ethylene and a $C_2$ to $C_{20}$ aliphatic ester of a mono ethylenically unsaturated mono- or dicarboxylic acid.

If desired, a mixture of terpolymers and/or copolymers can be used. Likewise, in preparing the terpolymer mixtures of ethylenically unsaturated acids and/or vinyl esters can be utilized and in preparing the copolymer a mixture of esters of unsaturated acids is suitably employed. In common usage and as used herein the terms terpolymer and copolymer respectively connote such mixed polymers. Minor amounts of olefins other than ethylene can also be incorporated in the monomer charge if desired although no significant advantage accrues therefrom.

In the case of the terpolymer, the weight percentage of units present in any terpolymer molecule which are

| Source | Commercial Name | Chemical Nature |
| --- | --- | --- |
| Monsanto | Arochlor 1260 | Chlorinated biphenyl |
| Union Carbide | Flexol 3G0 | Triethylene glycol di(2-ethyl hexoate) |
| Monsanto | Santicizer 8 | N-ethyl mixed ortho and para toluenesulfonamides |
| Argus Chemical | Drapex 3.2 | Epoxy plasticizer |
| Hercules | Abalyn | Methyl ester of rosin |
| Hercules | Abitol | Hydroabietyl alcohol |
| Diamond Alkali | Chlorowax 70 | Chlorinated paraffin |
| Rohm & Haas | Dibenzyl sebacate | Ester |
| Argus Chemical | Drapex 3.2 | Epoxy plasticizer |
| Baker Castor Oil | 15 Oil | Polymerized (oxidized) castor oil |
| Hercules | Flexalyn | Glycol ester of rosin |
| Hercules | Hercoflex 150 | n-Octyl n-decyl phthalate (mixture) |
| Hercules | Hercolyn | Hyd. methyl ester rosin |
| Hercules | Hydrolyn A | Hydroabietyl alcohol ester |
| Pacific Vegetable Oil | Isano Oil | Glyceride |
| Eimer & Amend | Lead Stearate | Lead stearate |
| Neville | Nevillac 10° | Alkyl hydroxy resin |
| Hercules | Petrex SS | Alkyd of resinous terpene acid |
| Hercules | Polypale Ester No. 1 | Ethylene glycol ester of polymerized rosin |
| Hercules | Polypale Ester No. 10 | Glycerol ester of polymerized rosin |
| Hercules | Staybelite Ester No. 10 | Glycerol ester of hydrogenated rosin |
| Pennsylvania Industrial Chemical Corporation | Piccotex 75 | Vinyl-toluene copolymer |
| Union Carbide | ZKMA 0251 | Polyketone resin |
| Union Carbide | ZKMA 0252 | Polyketone resin |
| Union Carbide | ZKMA 0250 | Polyketone resin |
| Mohawk Ind. | MR 97 | Aliphatic ketone resin |
| Mohawk Ind. | MR 82 | Aliphatic ketone resin |
| Hercules | Resin 7310 | Dehydrogenated rosin |
| Hercules | a-Piccolyte 100 | Modified rosin | derived from each of the three monomeric components can suitably be as follows:

| | | |
|---|---|---|
| Ethylene | 60 to 95 | preferably 70 to 85 |
| Unsaturated mono or dibasic acid | 1 to 10 | preferably 2 to 5 |
| Vinyl ester | 5 to 40 | preferably 10 to 30 |

The presence of the indicated percentage of mono- or dibasic acid derived units will afford terpolymer having the desired acid number. Terpolymers having acid numbers outside the indicated range afford inferior adhesives as hereinafter discussed in greater detail.

The vinyl esters of the $C_1$ to $C_6$ aliphatic carboxylic acids are known compounds many of which, such as vinyl acetate, vinyl propionate and vinyl butyrate, are widely commercially available. Any one of these esters or any mixture thereof can suitably be used. Suitable ethylenically unsaturated mono- or dibasic acids include acids having from 3 to about 50 carbons. Such acids can have one or more ethylenic double bonds and can be alicyclic or aliphatic. Suitable acids include by way of illustration, acrylic, methacrylic, maleic, fumaric, citaconic, aconitic, itaconic, brassidic acid, a-(1-cyclohexenyl)-butyric acid, 2-cyclopentene-1-acetic acid, 5-norbornen-2-carboxylic acid, 3-cyclohexene-1-carboxylic acid, endo-5-norbornene-2,3-dicarboxylic acid, 3,4,5,6-tetra-hydro phthalic acid, 1,2,3,6-tetra-hydro phthalic acid, and also citric or other acids which can decompose at the polymerization temperature to form unsaturated dicarboxylic acids in situ, or any mixture thereof.

In the case of the copolymer, the weight percentage of units in any copolymer molecule which are derived from each of the monomeric components can suitably be as follows: ethylene 60 to 95, preferably 70 to 90, and, correspondingly, $C_2$ to $C_{20}$ aliphatic ester of mono ethylenically unsaturated mono- or dicarboxylic acid 40 to 5, preferably 30 to 10. The desired copolymer acid number is achieved by including in the polymerization charge the appropriate quantity of unsaturated ester monomer wherein the carboxylic acid moieties are not fully esterified. Co- or terpolymers having acid numbers outside the indicated range afford adhesives that are inferior in that they do not provide the outstanding advantages of the adhesive formulations of the instant invention. The unsaturated mono- or dicarboxylic acids the esters of which are suitable comonomers are the same as those acids which are appropriately used to prepare the terpolymer, as previously described.

The co- or terpolymers of this invention can be readily prepared by copolymerizing a mixture of the appropriate comonomers in the presence of a free radical polymerization initiator such as a peroxygen compound, e.g., lauroyl peroxide or t-butyl peracetate, or an azobis compound, e.g., azobisisobutyronitrile, at a somewhat elevated temperature and pressure, e.g., 90° to 250° C, and a pressure of 1000 to 1750 atmospheres, then separating the resulting polymer from the unpolymerization materials, e.g., by vaporization of the latter. By varying the monomers employed, the concentrations of the monomers and initiators in the reaction mixture, and polymerization conditions such as reaction time, pressure and temperature, polymers of the desired kind and degree of polymerization and acid number can be readily obtained. The terpolymers can also be made by batch polymerization methods, but non-homogeneous polymers frequently result. Continuous methods in which a suitable mixture of the comonomers and initiator is continuously passed through a reaction zone maintained at the desired temperature and pressure conditions, are therefore preferred since they yield substantially homogeneous copolymer products. The reaction zone and rate of flow of reaction mixture therethrough should be such as to provide an appropriate residence time.

Ethylene terpolymers of the type useful in the practice of the instant invention and the preparation thereof are described in U.S. Pats. Nos. 3,215,657 and 3,215,678 and in duPont Elvax Product Information Bulletin PL16-1070, the disclosures of which are incorporated herein by reference. It should be noted that although these patents and Bulletin describe the use of such terpolymers either alone or in combination with petroleum wax as hot melt adhesives, these prior art adhesives are significantly inferior to the adhesive of the present invention with respect to peel strengths especially at temperatures above room temperature and adhesion to difficulty bondable substrates such as lead.

The ethylene-unsaturated acid ester copolymers of the type useful in the practice of the instant invention and the preparation thereof are described in: Bonotto, S., Krevsky, B. H., SPE Journal, May, 1962 and U.S. Pat. No. 2,953,541 to Pecha, R. J., Samuels, H., and Kay, D. C., and assigned to Union Carbide Corporation.

Component (b) is a polyamide condensation interpolymer of at least one diamine with one or more dibasic acids, with dimer acid being the preferred major dibasic acid component.

These condensation interpolymers are ordinarily prepared by reacting a molar excess of the amine group containing molecules with the carboxylic acid group containing molecules. The amount of amine utilized should be sufficient to provide a polyamide having an amine number ranging from about 70 to about 400. We have found this amine number is required to provide an adhesive having the aforementioned outstanding properties.

Suitable diamines include primary diamines which may be ideally represented by the formula

where R is an aliphatic, cycloaliphatic or aromatic radical, preferably having from 2 to about 40 carbon atoms. While R is preferably a hydrocarbon radical, R may optionally also contain ether linkages such as in the diamines prepared from diphenyl ether. If R is aliphatic, it can be a saturated straight or branched chain radical. Representative of such diamines are the alkylene diamines having from 2 to 20 carbon atoms (preferably 2 to 6) such as ethylene diamine, 1,2-diamino propane, 1,3-diamino propane, 1,3-diamino butane, tetramethylene diamine, pentamethylene diamine, hexamethylene diamine, decamethylene diamine, and octadecamethylene diamine. In addition, aliphatic diamines carrying 1 to 3 lower alkyl substituents or a higher alkyl substituent are useful, for example, 2,5-dimethyl-hexamethylenediamine, 2-methyl-4-ethylhexamethylenediamine, 2-ethyl-4-methylhexamethylenediamine, a mixture of 2,4,4-trimethylhexamethylenediamine and 2,2,4-trimethylhexamethylenediamine or a mixture of 9-aminomethylstearylamine and 10-aminoethylstearylamine. In addition, aromatic diamines such as metaxylylene diamine, paraxylylene diamine and alicyclic diamines such as cyclohexylene diamine, 1,3-di-4-piperidyl propane, bis(β-aminoethyl)-benzene, cyclohexane-bis(methyl amine), diaminodicyclohexylmethane, methylylene dianiline, bis-(aminoethyl) diphenyl oxide, and dimeric fat diamine can be utilized.

Dimeric fat diamine, sometimes referred to as "dimer diamine," "dimeric fat amine," or "polymeric fatty acid diamine" connotes the diamines prepared by amination of dimeric fatty acids as hereinafter described. Reference is made thereto in U.S. Pat. No. 3,010,782, the disclosure of which is incorporated herein by reference. As indicated therein, these amines are prepared by reacting polymeric fatty acids with ammonia to produce the corresponding nitriles and subsequently hydrogenating the nitriles to the corresponding amines. Upon distillation, the dimeric fat diamine is provided which has essentially the same structure as a dimeric fat acid except that the carboxyl groups are replaced by —CH$_2$NH$_2$ groups. Further, this diamine is also described in Research and Development Products Bulletin, CDS 2-63 by General Mills, Inc., June 1, 1963, as "Dimer Diamine" illustrated by the formula H$_2$N—D—NH$_2$ where D is an approximately 36-carbon hydrocarbon radical of a dimeric fatty acid.

Diamines which are interrupted by oxygen atoms in the chain (also called ether diamines) and which are also suitable can be represented by the general formula:

$$H_2N-(CH_2)_n-O-(R-O)_x-(CH_2)_n-NH_2$$

where n can be a number from 3 to 5, where x can have a value of 0, 1, 2, or 3, and where R is an alkyl group with a chain length of 1 to 12 carbon atoms, which may also carry alkyl substituents of 1 to 4 carbon atoms.

Examples of ether diamines of this general formula are: 1,7-diamino-4-oxoheptane, 1,11-diamino-6-oxoundecane, 1,7-diamino-3,5-dioxoheptane, 1,10-diamino-4,7-dioxoundecane, 1,10-diamino-4,7-dioxo-5-methyldecane, 1,11-diamino-4,8-dioxoundecane, 1,11-diamino-4,8-dioxo-5-ethylundecane, 1,12-diamino-4,9-dioxododecane, 1,13-diamino-4,10-dioxotridecane, 1,14-diamino-4,11-dioxotetradecane, 1,11-diamino-4-8-dioxo-5,6-dimethyl-7-propionylundecane, 1,14-diamino-4,7,10-trioxotetradecane, 1,13-diamino-4,7,10-trioxo-5,8-dimethyltridecane, 1,20-diamino-4,17-dioxoeicosane, 1, 16-diamino-4,7,10,13-tetraoxohexadecane.

Monoalkanolamine may also be employed which preferably have the general formula $$NH_2-R-OH$$

where R is a divalent aliphatic hydrocarbon radical from 2 to 8 carbon atoms. Ethanolamine is preferred, however, further examples are: propanolamine, butanolamine, 2-amino-3-hexanol, 2-amino-4-pentanol, 5-amino-4-octanol, 3-amino-3-methyl-2-butanol and similar compounds. Such alkanol amines, of course, afford polyester amides.

The diamine may be employed alone or mixtures of two or more may be employed. The most preferred diamines are the alkylene diamines in which the alkylene group has from 2 to 6 carbon atoms and mixtures thereof with dimeric fat diamine.

As heretofore indicated, the dibasic acid used to form the polyamide component (b) preferably consists predominantly of dimer acid. By predominantly is meant that at least about 60% of the carboxylic acid groups present are present in the dimer acid component of a dibasic acid mixture used to form the polyamide. It should be noted, however, that acceptable polyamides can be prepared using minor amounts or, indeed, no dimer acid. Other suitable dicarboxylic acids are enumerated hereinafter.

Dimer acid connotes a commercially available material obtainable by the coupling of unsaturated long chain monocarboxylic fatty acids, for example, oleic or linoleic acids. The resulting "dimer" is a mixture of many isomers, with various degrees of unsaturation and ring formation, depending on the unsaturation of the starting materials. The precise structure of the isomers and the proportions of each isomer in the mixture vary with the method of combination (which varies according to the manufacturer), and, of course, the starting material or materials. Trimers and higher degrees of polymerization are also present to a minor extent.

The structure of these dimer acids has been the subject of considerable investigation. To indicate the background of this aspect of the invention, the following references are listed, but it is to be understood that the scope of the present application is not limited by or to the structures disclosed in the references.

Based on the work of R. F. Paschke, L. E. Peterson, and D. H. Wheeler, Journal of the American Oil Chemists' Society, 41, 723 (1964), it is conjectured that four possible structures for thermal dimers of 10-trans, 12-trans-linoleic acid are:

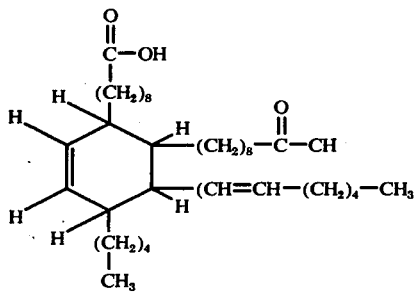
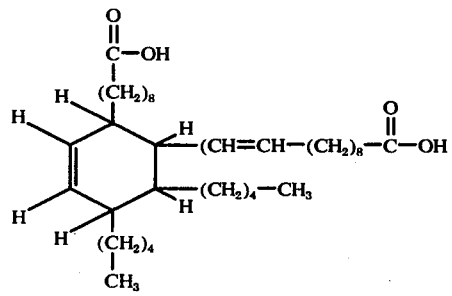

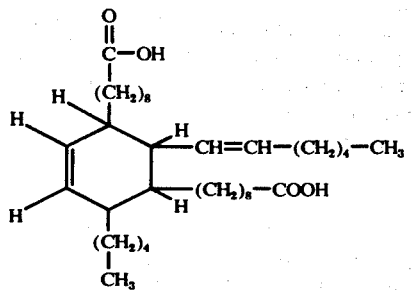
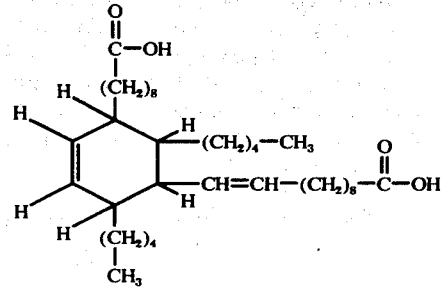

It will be noted that the number of carbon atoms between the carbonyl carbons varies between 18 and 21, that is, that the chain length is between 20 and 23 inclusive of the carbonyl carbons. Further, it will be noted that there are branches of up to 9 carbon atoms exclusive of the ring carbons.

J. C. Cowan, Journal of the American Oil Chemists' Society, 39, 723 (1962) discusses generally the possible structures of similar dimers. Emery Industries, Inc. Technical Bulletin 412B, "Abstracts of Dimer Acid Use-Patents and Journal References", January, 1967, at pages 2 and 3, gives abstracts of a number of references, and R. F. Paschke, L. E. Peterson, S. A. Harrison, and D. H. Wheeler, Journal of the American Oil Chemists' Society, 41, 56 (1966) discusses the structures of the dehydrodimer from methyl oleate with di-t-butyl peroxide. These references all in turn refer to other relevant literature.

These dimer acids, whatever their precise structure, which varies from producer to producer, all contain a mixture of isomers. At least some of the isomers, and in most cases all, contain some unsaturated carbon-to-carbon bonds, and to enhance oxidative stability of the amide prepared therefrom, these are preferably removed by hydrogenation to give a saturated, or predominantly saturated, product. It has been found that while all dimer acids may be hydrogenated into suitable starting materials for the manufacture of the polyamides of the present invention, the various methods of manufacture and different starting materials used by the different manufacturers result in a range of polyamides having slightly varying properties.

Other dicarboxylic acids are appropriately used in lieu of, or in admixture with, the dimer acid to increase the softening point of the polyamides obtained therefrom. Suitable dicarboxylic acids include aliphatic, cycloaliphatic, or aromatic dicarboxylic acids or esters which may be defined by the formulae:

where R is an aliphatic, cycloaliphatic, or aromatic hydrocarbon radical preferably having from 1 to 20 carbon atoms (the most preferred being where R is an alkylene radical having from 6 to 12 carbon atoms) and $R_1$ is hydrogen or an alkyl group (preferably having from 1 to 8 carbon atoms). Illustrative of such acids are oxalic, malonic, adipic, sebacic, suberic, pimelic, azalaic, succinic, glutaric, isophthalic, terephthalic, phthalic acids, benzenediacetic acid, p-phenylene dipropionic acid, naphthalene dicarboxylic acids, and 1,4- or 1,3-cyclohexane dicarboxylic acid.

The polyamides used in the practice of the instant invention will preferably have a number average molecular weight ranging from about 2000 to about 10,000 and can be prepared by conventional amidification techniques which form no part of this invention. In general, this amidification is preferably conducted at a temperature ranging from about 180° to about 280° C after simple admixture of the desired quantities of amine and carboxylic acid moieties. Reaction with the diamines results in formation of the desired polyamide plus evolution of $R_1OH$ (i.e., water or alcohol).

Illustrative of polyamides suitable for incorporation into the composition of the present invention are those prefaced in accordance with the teaching of U.S. Pat. Nos. 3,249,629 and 3,449,273, the disclosures of which are incorporated herein by reference.

Unlike conventional polyamide adhesives, our combinations of preferred polyamides and ethylene co- or ter-polymers do not become brittle until temperatures below −40° C and in many instances even below −70° C. Conventional polyamides generally embrittle at temperatures well above −40° C. Conversely, conventional ethylene co- and terpolymer adhesives do not have useful peel strengths at room temperature much less at +70° C whereas our combinations of preferred polyamides and ethylene co- or terpolymers and the adhesives prepared from them have excellent cohesive strength at this temperature as evidenced in the case of our adhesive by its good peel strength at this temperature. It should be noted, moreover, that the mere combination of the polyamide and ethylene co- or terpolymer adhesives known to the prior art does not result in a significantly superior adhesive formulation. It is only when amides and ethylene co- and terpolymers having the specific above-enumerated characteristics plus tackifier are combined in the indicated ratio that a particularly superior formulation results. While we do not wish to be bound by any particular mechanistic interpretation, it is believed that the extraordinarily low brittle temperature of the combination of polyamides and ethylene co- and terpolymers having the specific above-enumerated characteristics without or with the tackifier and the high adhesive strength of the adhesive composition is due to the fact that the mixture without tackifier is a compatible mixture.

It is believed that the compatibility of the amide and ethylene co- or terpolymer results from salt formation between the acid and amine groups (similar to that which occurs between a metal ion and a carboxylated polymer which results in the class of polymers commonly called ionomers), which in turn leads to the aforesaid many desirable features of the invention.

In cases where the glass transition temperature of the individual polymers are sufficiently distinct the combination of the two is seen to have a single glass transition temperature. However with many of the preferred polymer ingredients the glass transition temperatures are complex and multiple in nature and overlap one another so that the resultant mixture similary has a complex and multiple transition. However, that compatibility as described above occurs is strongly suggested by the extraordinarily low brittle temperatures of the mixtures especially when compared with those of prior art blends. The combining of polyamides or ethylene co- or terpolymers not having the above-enumerated characteristics apparently does not afford a compatible mixture and hence such mixtures do not manifest outstanding advantages.

It is preferred for the tackifier also to have, if not the degree of compatibility referred to above, at least a degree of compatibility such as results if the amide acid polymer combination is wetted by the tackifier during blending and during application of the adhesive combination to a substrate.

Additional components which may optionally be advantageously added to the adhesive formulation of the instant invention include hardeners, fillers, extenders, fortifiers, carriers, and preservatives of the type known to the art.

It should be noted that although all the individual components of the instant adhesive formulation are separately known to the prior art, the instant combination has never heretofore been proposed. Furthermore, as already indicated, the combination of the present invention is uniquely superior in adhesive effectiveness in comparison with the individual components thereof either alone or in any of the combinations thereof known to the prior art. Such unexpected superiority will be shown in somewhat greater detail by the following examples which further serve to illustrate the invention.

EXAMPLE 1

Preparation of an Approximately Stoichiometric Fatty Polyamide

A one liter resin kettle was equipped with a glass-shafted, Teflon-bladed stirrer, a thermometer, a nitrogen inlet tube, and a Claisen distilling head. The kettle was heated by a silicone oil bath on a magnetic-stir hot plate. The take-off system consisted of the distilling head, a condenser, a receiver, and a gas bubbler. Dimer acid (Empol 1010, neutralization equivalent 289.2, 348.2 g, 0.60 mole) and hydrogenated distilled dimer diamine (neutralization equivalent 289, 92.9 g, 0.17 mole) were added to the kettle. Ethylene diamine (Matheson, Coleman and Bell, 99%, 30.5 ml, 27.1 g, 0.45 mole) was added by pipette, the stirring was immediately started and heat was applied to the oil bath. There was an immediate temperature rise and thickening of the kettle contents as salt formation took place (no precipitate formed). Heating to 200° to 215° C was accomplished in about 1.5 hours while a very slow stream of nitrogen passed through the vessel. As the temperature increased, the mass became less viscous and water of reaction was given off at 140° to 155° C. The temperature was maintained at 205° to 215° C for about 3 hours while stirring continued. After 3 hours at temperature, the nitrogen inlet was plugged, the stirring was stopped, and vacuum was carefully applied using a water aspirator. Heating at 210° to 215° C with vacuum applied was continued for about one hour. The viscous, clear yellow melt was poured out under a stream of nitrogen into a Teflon-lined pan and rapidly cooled on dry ice. The material was then chopped for analysis and compounding.

Analysis: Inherent viscosity (0.5% in $CHCL_3$, 30° C) of 0.27, softening point (ring and ball) of 110° C, and amine number (milli-equivalents/kg of sample by titration of a chlorobenzene solution of the polyamide using $HClO_4$ in glacial acetic acid) of 25.

EXAMPLE 2

Preparation of an Amine-Rich Fatty Polyamide

The apparatus of the previous example was used. Dimer acid (Empol 1010, 348.2 g, 0.60 mole) and hydrogenated, distilled dimer diamine (65.7 g, 0.11 mole) were added to the kettle followed by ethylene diamine (36.3 ml, 0.54 mole). The heating and stirring were begun as before and 200° to 210° C was maintained for about 4 hours. Heat and aspirator vacuum were applied without stirring for an additional one hour. The batch was finished and cooled as before.

Analysis: Inherent viscosity of 0.24, softening point of 101° C, and amine number of 147.

EXAMPLES 3 to 5

The peel test is carried out as follows:

1. Polyethylene or lead jacketed telephone cable approximately 1.5 inch in diameter by 5 inches long is wiped with a solvent such as methyl ethyl ketone or methylene chloride to remove surface dirt and grease.

2. A solution or melt cast sheet of adhesive approximately 2.5 inches by 5 inches long by 0.025 inch thick is wrapped around the clean cable surface.

3. A pre-expanded, heat recoverable, crosslinked, polyethylene tube is slipped over the adhesive and shrunk onto the adhesive-coated cable with a gas flame. This heating also causes the adhesive to melt and flow. Normal heating time to accomplish the operation is about 2 minutes.

4. After cooling, the jacketed cable sample is cut transversely to afford five 1-inch wide segments and the copper conductor wires removed from within the segments.

5. The 1-inch wide segment is slipped over a cylindrical metal mandrel which is fixed at the ends. The mandrel is free to rotate about its longitudinal axis. The mandrel is attached to a jig which fits the gripping jaws of an Instron Test Machine.

6. A longitudinal slit is made across the 1-inch dimension in the outer polyethylene tube through to the adhesive layer to form a tab which is inserted in the top jaw of the test machine.

7. The adhesive bond holding the polyethylene tube to the cable jacket is tested for strength in peel. This peel test is similar to ASTM D8176-69 except that the specimen is peeled from a mandrel fixture rather than a T-peel configuration. The crosshead speed of the test machine is set at a jaw separation rate of 2 inches per minute. An enclosure is available to permit testing the adhesive bond strength at temperatures above or below room temperature.

Results are given in pounds per linear inch to failure. Failure can be either adhesive, i.e., failure occurs at the interface between the adhesive and either substrate; or cohesive, i.e., the adhesive bond to the substrates exceeds the cohesive strength of either the substrates or the adhesive itself and failure does not occur at any interface but in the bulk of the adhesive or substrate.

Adhesives adherent enough to provide for cohesive failure are, of course, highly desirable.

EXAMPLE 3

The following test results were obtained using a polyethylene jacketed and/or a lead jacketed telephone cable.

| Sample | Test Temperature (° C) | Peel Strength (pli) a)* | b)* | Type of Failure | Temperature of Embrittlement (° C) |
|---|---|---|---|---|---|
| Elvax 4355 + | −40 | <10 | 2 | Adhesive | <−50 |
| 10% ZKMA 0251 | +25 | 15 | 3 | Cohesive | 50 |
|  | +70 | ~0 | ~0 | Adhesive | 50 |
|  | −40 | Brittle | — | Adhesive | −20 |
| Polyamide of Example 1 | +25 | Ca. 10 | 2 | Cohesive | 20 |
| + 10% ZKMA 0251 | +70 | ~0 | — | Adhesive | 20 |
|  | −40 | Brittle | — | Adhesive | −20 |
| Polyamide of Example 2 | +25 | Ca. 10 | 2 | Cohesive | 20 |
| + 10% ZKMA 0251 | +70 | ~0 | — | Adhesive | 20 |
| A | −40 | Brittle | — | Adhesive | −20 |
| B | +70 | Fell Apart | — | Adhesive | 20 |
| C | +25 | ~10 | 2 | Cohesive | 20 |
| D | −40 | 20 | 6 | Cohesive | <−50 |
| E | +70 | 5 | 7 | Cohesive | 50 |
| F | +25 | 40 | 20 | Cohesive | 50 |
| G | +25 | 12 | 2 | Adhesive | −30 |
| H | +25 | 10 | 3 | Adhesive | −20 |
| I | +25 | 46 | 16 | Cohesive | <−50 |
| J | +25 | 38 | 18 | Cohesive | <−50 |
| K | +25 | 25 | 14 | Cohesive | <−50 |
| L | +70 | 8 | 8 | Cohesive | <−50 |
| M | +70 | >10 | 9 | Cohesive | <−50 |
| N | +70 | 3 | 1 | Adhesive | −30 |
| O | +70 | >10 | 7 | Cohesive | <−50 |
| P | +70 | ~0 | — | Adhesive | −30 |
| Q | +70 | ~0 | — | Adhesive | −20 |
| R | +70 | 3 | 3 | Cohesive | <−50 |
| S | +70 | 4 | 2 | Cohesive | −45 |
| T | +70 | <1 | <1 | Cohesive | −45 |
| U | +70 | <1 | <1 | Cohesive | <−50 |

* a) indicates peel strength to polyethylene jacketed cable; b) indicates peel strength to lead jacketed cable.

The ethylene terpolymer used in all of Samples A through U of Example 3 was duPont Elvax 4355. This material is a terpolymer of ethylene (74%), vinyl acetate (25%), and methacrylic acid (<1%) (all parts by weight) and has an acid number of about 6. All Samples A through P contained equal amounts of Elvax and polyamide. Samples A through U contained 10 parts of ZKMA 0251 tackifier per 100 parts of combined Elvax and polyamide. All samples were prepared by mixing the constituents in a compounding extruder at 150° C. All Samples A through U had ring and ball softening points within the range of 90° to 160° C. When samples were tested for glass transition temperature, Samples D through F, I, J, K, L, M, O, R, S, T, and U showed a single glass transition temperature while Samples A through C, G, H, N, P, and Q showed two distinct peaks.

The sample constituents were as follows:
A through C: Polyamide of Example 1
D through F: Polyamide of Example 2
G: Versalon 1165 (General Mills polyamide), amine number = 25 (amide of dimer acid and ethylene diamine)
H: Coramide 230 (Cooper Polymer), polyamide amine number = 53
I: Versalon 1140 (General Mills), polyamide of dimer acid, sebacic acid, ethylene diamine, and dipiperidyl propane, amine number = 150
J: Versalon 1300 (General Mills), polyamide of dimer acid, ethylene diamine and dimer diamine, amine number = 180

K: Polyamide prepared according to Example 2, but containing sufficient ethylene diamine to afford an amine number of 619

L: Polyamide prepared using the procedure of Example 1 from an 80:20 mole percent mixture of Empol 1010 (dimer acid) and phthalic acid and sufficient butanol amine to afford polyamide of amine number of 110

M: Polyamide prepared using the procedure of Example 1 from Empol 1014 (mixture of dimer and trimer acid) and excess decamethylene diamine (amine number of 150)

N: Same as M but limited excess diamine (amine number of 50)

O: Polyamide prepared according to procedure of Example 1 using 50:50 mole percent mixture of Empol 1010 dimer acid and sebacic acid and 50:50 mole percent trimethylene dipiperidine and dimer diamine, amine number of 130

P: Same as O but limited excess amine, amine number of 44

Q: Elvax 4355 (60% by weight) plus polyamide of Example 1 (40% by weight)

R: Elvax 4355 (60% by weight) plus polyamide of Example 2 (40% by weight)

S: Elvax 4355 (40% by weight) plus polyamide of Example 2 (60% by weight)

T: Elvax 4355 (25% by weight) plus polyamide of Example 2 (75% by weight)

U: Elvax 4355 (75% by weight) plus polyamide of Example 2 (25% by weight)

EXAMPLE 4

A variety of ethylene copolymers and terpolymers were evaluated for adhesive strength both alone and in conjunction with polyamide. All samples contained ZKMA 0251 (10 parts by weight per 100 parts of ethylene polymer or combined ethylene polymer plus polyamide). The ethylene polymer/polyamide ratio was 50:50 by weight in all samples containing polyamide plus ethylene polymer. The polyamide used in all cases was essentially identical to that prepared in Example 2.

Samples were as follows. Samples A through E were duPont Elvax terpolymers which are terpolymers of ethylene, methacrylic acid and vinyl acetate of the following approximate composition.

A: Elvax 4260, vinyl acetate 28%, methacrylic acid <10%, ethylene 71%, acid number = 6

B: Elvax 3689.3, vinyl acetate 12%, methacrylic acid 4%, ethylene 84%, acid number = 30

C: Elvax 3633.6, vinyl acetate 24%, methacrylic acid 4%, ethylene 72%, acid number = 30

D: Elvax 4355, vinyl acetate 25%, methacrylic acid 1%, ethylene 74%, acid number = 6

E: Elvax 3633.3, vinyl acetate 28%, methacrylic acid 4%, ethylene 68%, acid number = 20

Samples F through H are copolymers of ethylene and acrylic acid containing, respectively, 6%, 15%, and 20% acrylic acid. Sample I is a modified copolymer of ethylene and ethyl acrylate (18%) wherein part of the ethyl acrylate has been saponified and then acidified to provide the necessary acid groups.

The polymers of Samples F through H when combined with polyamide were effective, thus indicating that copolymers of ethylene with unsaturated acid without any ester moieties being present are also effective. Sample I demonstrates another method of achieving the desired acid number. That is, an ethylene unsaturated ester copolymer can be modified by partial saponification and then acidified to achieve the desired acid number. The commercial name and acid number of these samples is as follows:

F: Union Carbide EAA 9060, acid number = 45
G: Union Carbide EAA 9320, acid number = 115
H: Union Carbide EAA 9300, acid number = 150
I: Union Carbide DPD 6169, acid number = 35
J through L: Elvax 4260 plus polyamide
M through O: Elvax 3689.3 plus polyamide
P: Elvax 3633.6 plus polyamide
Q: Elvax 3633.3 plus polyamide
R: DPD 9169 (modified) plus polyamide
S: DPD 9169 (modified to acid number = 2) plus polyamide
T: DPD 9169 (modified to acid number = 7) plus polyamide
U: DPD 9169 (modified to acid number = 35) plus polyamide
V: Experimental terpolymer of ethylene (65%), vinyl acetate (20%), methacrylic acid (15%), acid number = 100, plus polyamide
W: Experimental terpolymer of ethylene (75+%), vinyl acetate (24%) and methacrylic acid (0.25%), acid number = 2
X: Experimental terpolymer containing 75% wt. ethylene, 20% wt. vinyl propionate and 5% wt. tetrahydrophthalic acid, acid number = 15, plus polyamide
Y: Experimental copolymer containing 80% wt. ethylene and 20% wt. mixed mono- and diethyl maleate with sufficient monoethyl maleate being present to provide an acid number of 10
Z: Union Carbide EAA 9060 plus polyamide
AA: Union Carbide EAA 9320 plus polyamide
BB: Union Carbide EAA 9300 plus polyamide

| Sample | Test Temperature (°C) | Peel Strength (pli) a)* | Peel Strength (pli) b)* | Type of Failure | Temperature of Embrittlement (°C) |
|---|---|---|---|---|---|
| A | +25 | 10 | 3 | Adhesive | <−50 |
| B | +25 | 12 | 2 | Adhesive | <−50 |
| C | +25 | 15 | 3 | Adhesive | <−50 |
| D | +25 | 11 | 2 | Adhesive | <−50 |
| E | +25 | 11 | 2 | Adhesive | <−50 |
| F | +25 | 7 | 2 | Adhesive | <−50 |
| G | +25 | 5 | 2 | Adhesive | <−50 |
| H | +25 | 5 | 1 | Adhesive | <−50 |
| I | +25 | 20 | 4 | Adhesive | <−50 |
| J | −40 | 35 | 10 | Cohesive | <−50 |
| K | +25 | ~50 | 20 | Cohesive | <−50 |
| L | +70 | >10 | >10 | Cohesive | <−50 |
| M | −40 | 30 | 8 | Cohesive | <−50 |
| N | +25 | 45 | 18 | Cohesive | <−50 |
| O | +70 | >10 | 9 | Cohesive | <−50 |
| P | −40 | 25 | 7 | Cohesive | <−50 |
| Q | −40 | 27 | 9 | Cohesive | <−50 |
| R | −40 | 5 | 2 | Adhesive | <−50 |
| S | −40 | 7 | 3 | Adhesive | −30 |
| T | −40 | 15 | 6 | Cohesive | <−50 |
| U | −40 | 32 | 9 | Cohesive | <−50 |
| V | +25 | 19 | 4 | Adhesive | <−50 |
| W | +25 | 15 | 2 | Adhesive | −30 |
| X | +25 | 41 | 16 | Cohesive | <−50 |
| Y | +25 | 37 | 14 | Cohesive | <−50 |
| Z | +25 | 35 | 13 | Cohesive | <−50 |
| AA | +70 | 2 | 1 | Adhesive | <−50 |
| BB | −40 | 5 | 1 | Adhesive | <−50 |

*a) peel strength to polyethylene jacketed cable, b) peel strength to lead jacketed cable The melt index (M.I.) of a polymer is well recognized as being related to its molecular weight, the lower the melt index the higher being the molecular weight. The melt index values of polymers are most suitably determined by the tentative ASTM test method D1238-70, Conditon E (ASTM Standards, 1972, Part 27, pages 424 to 434). The value is the weight in grams that is extruded through an orifice 0.0825 inch in diameter and 0.315 inch long over a period of 10 minutes at 190° C under a pressure of 2160 grams. The melt index values of the polymers of the instant invention in accordance with this method can range from 0.5 to 200 and are generally from about 5 to 25 to provide a readily flowable material. Particularly preferred adhesive compositions are seen to be obtained when the polyamide has an amine number ranging from about 100 to 300 and the ethylene co- or terpolymer has an acid number ranging from about 5 to 40.

EXAMPLE 5

A variety of tackifiers was also evaluated. In all cases, the adhesive formulation showed a single glass transition temperature. All formulations contained 50 parts by weight Versalon 1300, 50 parts Elvax 4260, and 10 parts tackifier. All tests were at +70° C. In all instances the embrittlement temperature of the adhesive formulation was below −40° C.

| Tackifier | Peel Strength (pli) a)* | Peel Strength (pli) b)* | Type of Failure |
|---|---|---|---|
| ZKMA 0251 | >10 | >10 | Cohesive |
| Alpha Piccolyte 100 | 9 | 8 | Cohesive |
| Polypale No. 1 | 10 | 8 | Cohesive |
| None | 7 | 5 | Cohesive |
| Arochlor 1260 | 8 | 6 | Cohesive |
| Chlorowax 70 | 10 | 6 | Cohesive |
| Flexol 3G0 | 9 | 6 | Cohesive |
| Santicizer 8 | 8 | 6 | Cohesive |
| Pentalyn C | 9 | 7 | Cohesive |

-continued

| Tackifier | Peel Strength (pli) a)* | b)* | Type of Failure |
|---|---|---|---|
| Nevillac 10° | 9 | 8 | Cohesive |
| Drapex 3.2 | 8 | 6 | Cohesive |

*a) peel strength to polyethylene jacketed cable, b) peel strength to lead jacketed cable

EXAMPLE 6

A series of tests were conducted to ascertain suitable compositional ranges for the compositions of the instant invention. Peel tests were carried out using polyethylene jacketed cable. In all cases the olefin polymer was Elvax 4260, the polyamide was Versalon 1140 and the tackifier was ZKMA 0250. Results are tabulated below.

| Parts by Weight | | | Average (3 tests) Peel Strength in p.l.i. | | |
|---|---|---|---|---|---|
| Olefin Polymer | Polyamide | Tackifier | +70° C | +25° C | −40° C |
| 100 | -0- | 10 | <0.5 | 7 | <0.5 |
| 80 | 20 | 10 | 1.5 | 13.5 | 3 |
| 70 | 30 | 10 | 3 | 28 | — |
| 60 | 40 | 10 | 7 | 43 | — |
| 50 | 50 | 10 | 14 | 45 | — |
| 40 | 60 | 10 | 15 | 51 | — |
| 30 | 70 | 10 | 6 | 22 | 4 |
| 20 | 80 | 10 | 1 | 12 | 4 |
| 47 | 47 | 6 | 22 | 53 | 9.5 |
| -0- | 100 | 10 | <0.5 | 4 | <0.5 |

The results indicate that although the optimum ratio of olefin polymer to polyamide ranges from about 60:40 to 40:60 significant enhancement of adhesive properties occurs within the range 80:20 to 20:80.

EXAMPLE 7

Equal parts by weight of General Mills Versalon 1140 and duPont Elvax 4824 were admixed in a high shear mixer maintained at about 125° C. On cooling, the resulting visually homogenous product had a uniform light brown color. The cold impact temperature according to ASTM D746 was below −75° C. This mixture is hereafter called Blend I.

Blends containing equal parts by weight of a different polyamide and/or ethylene polymer were prepared as shown below utilizing the same apparatus and procedure reported above. In all cases the products were visually similar to Blend I. Cold impact temperatures are shown below:

| | | Cold Impact Temperature |
|---|---|---|
| Blend II | Versalon 1140 + Elvax 250 | −25° C |
| Blend III | Versalon 1165 + Elvax 4824 | −20° C |
| Blend IV | Versalon 1165 + Elvax 250 | −25° C |

Blends I – IV as prepared above were each separately hot blended with 10 weight percent of ZKMA 0251 polyketone tackifier. The three component adhesive mixtures thereby formed were tested for peel strength. The results obtained are tabulated below:

| Blend* | Test Temperature (° C) | Cable Jacket Material | Peel (pli) Strength | Type of Failure |
|---|---|---|---|---|
| I | −40 | polyethylene | >60 | substrate failed outside bond line which remained unaffected |
| I | +25 | polyethylene | 44 | cohesive |
| I | +70 | polyethylene | 18.5 | cohesive |
| I | +25 | lead | 15.5 | adhesive |
| I | +70 | lead | 16.5 | cohesive |
| II | −40 | polyethylene | 5.7 | adhesive |
| II | +25 | polyethylene | 20.5 | adhesive |
| II | +70 | polyethylene | 2 | cohesive |
| II | +25 | lead | 17 | adhesive |
| II | +70 | lead | 1 | cohesive |
| III | −40 | polyethylene | 6.5 | adhesive |
| III | +25 | polyethylene | 9 | adhesive |
| III | +70 | polyethylene | 6 | cohesive |
| III | +25 | lead | 10.5 | adhesive |
| III | +70 | lead | 2.5 | cohesive |
| IV | −40 | polyethylene | 17 | adhesive |
| IV | +25 | polyethylene | 15 | adhesive |
| IV | +70 | polyethylene | 2 | cohesive |
| IV | +25 | lead | 18 | adhesive |
| IV | +70 | lead | 2.5 | cohesive |

*The term Blend refers to the blends containing 10% ZKMA 0251 tackifier amounts shown using a high shear mixer maintained at about 125° C.

The below enumerated components were admixed in the relative amounts shown using a high shear mixer maintained at about 125° C.

| Component | Amount (% by weight) |
|---|---|
| wax | 50 |
| rosin ester | 20 |
| polyamide resin | 5 |
| ethylene - RCOOR' copolymer | 25 |

The wax had the following properties:
melting point = 160°–165° F
viscosity = 47.7 SUS at 210° F The rosin ester had a softening point of about 235° F.

The polyamide had a ring and ball softening point of 330° F and a molecular weight of about 5000 to 10,000. It was predominantly a reaction product of dimerized linoleic acid and ethylene diamine although the reaction products of other acids and polyamines were also present. The ethylene-RCOOR' copolymer had a ring and ball softening point of about 280° F and a melt index of about 25. On cooling, the resulting admixture was visually homogenous and of a light brown color. This composition was also tested for peel strength and gave the following results:

| Test Temperature (° C) | Cable Jacket Material | Peel (pli) Strength | Type of Failure |
|---|---|---|---|
| −40 | polyethylene | | Sleeve Cracked |
| −40 | lead | | Sleeve Cracked |
| +25 | polyethylene | 5.5 | Adhesive |
| +25 | lead | 10.5 | Cohesive |
| +70 | polyethylene | 0.5 | Adhesive |
| +70 | lead | 0.5 | Adhesive |

The sleeve cracking noted at −40° C was at very low applied stress and in the bond area. This cracking is believed to be caused by migration of the wax into the sleeve during application.

To Blend I* was added 10 weight percent Chevron 165 microcrystalline wax. This composition was tested for peel strength with polyethylene cable and gave the following results:
*containing tackifier

| Test Temperature (° C) | Cable Jacket Material | Peel (pli) Strength | Type of Failure |
|---|---|---|---|
| −40 | polyethylene | 2 | Adhesive |
| +70 | polyethylene | 3.5 | Cohesive |

The foregoing results demonstrate the following:

1. The necessity for utilizing both a high amine number polyamide and a high acid number ethylene polymer in order to achieve the superior adhesive properties manifested by the adhesive disclosed and claimed in the instant application.

2. A high wax formulation of the type disclosed in House U.S. Pat. No. 3,377,305, affords an adhesive significantly inferior in comparison with Applicants' claimed composition.

3. The inclusion of even minor amounts of wax into Applicants' claimed adhesive formulation results in a severe degradation of adhesive properties.

What is claimed is:

1. A hot melt adhesive composition comprising a compatible mixture of: (a) an acidic polymer of ethylene having an acid number ranging from about 3 to about 80 selected from the group consisting of a terpolymer of ethylene, an ethylenically unsaturated mono- or dicarboxylic acid and a vinyl ester of $C_1$ to $C_6$ aliphatic carboxylic acid and a copolymer of ethylene and a $C_2$ to $C_{20}$ aliphatic ester of a mono ethylenically unsaturated mono- or dicarboxylic acid wherein a portion of the carboxylic acid moieties of said mono- or dicarboxylic acid component are not esterified, and (b) a polyamide having an amine number ranging from about 70 to about 400 with a tackifying agent wherein said tackifying agent is present in an amount ranging from about 3 to about 20 parts by weight per 100 parts of (a) and (b) together, components (a) and (b) being present in a relative proportion by weight ranging from about 40:60 to 60:40.

2. A composition in accordance with claim 1 wherein said tackifying agent is present in an amount ranging from about 5 to about 15 parts by weight per 100 parts of (a) and (b) together.

3. A composition in accordance with claim 1 wherein said tackifying agent is a polyketone resin.

4. A composition in accordance with claim 1 wherein said component (a) is a terpolymer of ethylene, ethylenically unsaturated mono- or dicarboxylic acid and vinyl ester of $C_1$ to $C_6$ aliphatic carboxylic acid and wherein the weight percentage of units present in said terpolymer derived from the monomeric precursors of said terpolymer is ethylene about 60 to 95; ethylenically unsaturated mono- or dicarboxylic acid about 1 to 10; and vinyl ester of $C_1$ to $C_6$ carboxylic acid 5 to 40.

5. A composition in accordance with claim 4 wherein said vinyl ester is vinyl acetate.

6. A composition in accordance with claim 4 wherein said unsaturated acid is selected from the group consisting of acrylic acid, methacrylic acid and mixtures thereof.

7. A composition in accordance with claim 4 wherein said weight percentages are ethylene 70 to 85; unsaturated acid 2 to 5; and vinyl ester 10 to 30.

8. A composition in accordance with claim 1 wherein said component (a) is a copolymer of ethylene and a $C_2$ to $C_{20}$ aliphatic ester of a mono ethylenically unsaturated mono- or dicarboxylic acid wherein a portion of the carboxylic acid moieties of said mono- or dicarboxylic acid component are not esterified and wherein the weight percentage of units present in said copolymer derived from the monomeric precursors of said copolymer is ethylene about 60 to 95, and $C_2$ to $C_{20}$ aliphatic ester of monoethylenically unsaturated mono- or dicarboxylic acid about 5 to 40.

9. A composition in accordance with claim 8 wherein said weight percentages are ethylene 70 to 90 and aliphatic ester 10 to 30.

10. A composition in accordance with claim 8 wherein said unsaturated acid is selected from the group consisting of acrylic, methacrylic, maleic and fumaric.

11. A composition in accordance with claim 1 wherein said component (b) is a condensation polymer of at least one amine with at least one dibasic acid wherein said amine is selected from the group consisting of diamines of the formula $H_2NRNH_2$ wherein R is an aliphatic, cycloaliphatic, or aromatic radical having from 2 to about 40 carbons, diamines of the formula

$$H_2N-(CH_2)_n-O-(R-O)_x-(CH_2)_n-NH_2$$

where $n$ is from 3 to 5, where $x$ is 0, 1, 2 or 3, and where R is an alkyl group with a chain length of 1 to 12 carbon atoms, which may also carry alkyl substituents of 1 to 4 carbon atoms and monoalkanol amines of the formula $NH_2-R'-OH$ wherein $R'$ is a divalent aliphatic hydrocarbon radical of 2 to 8 carbons.

12. A composition in accordance with claim 11 wherein said dibasic acid component comprises at least about 60% wt. dimer acid.

13. A composition in accordance with claim 11 wherein said amine has the formula $H_2NRNH_2$ wherein R is an aliphatic, cycloaliphatic, or aromatic radical having from 2 to about 40 carbons.

14. A composition in accordance with claim 11 wherein said amine is selected from the group consisting of alkylene diamines of 2 to 6 carbon atoms, dimeric fat diamine and mixtures thereof.

* * * * *